(12) United States Patent
Deb et al.

(10) Patent No.: US 10,672,163 B2
(45) Date of Patent: *Jun. 2, 2020

(54) LAYOUT ALGORITHM FOR ENTITY RELATION MODEL DIAGRAM

(71) Applicant: SAP SE, Walldorf (DE)

(72) Inventors: Suparna Deb, Bangalore (IN); Arun Bhaskaran Nair, Kannur (IN)

(73) Assignee: SAP SE, Walldorf (DE)

( * ) Notice: Subject to any disclaimer, the term of this patent is extended or adjusted under 35 U.S.C. 154(b) by 560 days.

This patent is subject to a terminal disclaimer.

(21) Appl. No.: 15/496,310

(22) Filed: Apr. 25, 2017

(65) Prior Publication Data

US 2017/0228909 A1  Aug. 10, 2017

Related U.S. Application Data

(63) Continuation of application No. 13/930,292, filed on Jun. 28, 2013, now Pat. No. 9,665,270.

(51) Int. Cl.
*G06T 11/60* (2006.01)
*G06F 8/34* (2018.01)
*G06F 3/0485* (2013.01)
*G06F 3/0488* (2013.01)

(52) U.S. Cl.
CPC .......... *G06T 11/60* (2013.01); *G06F 3/04855* (2013.01); *G06F 3/04883* (2013.01); *G06F 8/34* (2013.01)

(58) Field of Classification Search
CPC .... G06F 17/5009; G06F 8/34; G06F 3/04855; G06F 3/04883; G06T 11/60
USPC .............................. 703/6; 707/790, 796, 805
See application file for complete search history.

(56) References Cited

U.S. PATENT DOCUMENTS

| | | |
|---|---|---|
| 5,146,591 A | 9/1992 | Bachman et al. |
| 6,035,300 A | 3/2000 | Cason et al. |
| 6,639,611 B1 | 10/2003 | Leduc et al. |
| 6,678,693 B1 | 1/2004 | Shiraishi |
| 7,062,502 B1 | 6/2006 | Kesler |
| 7,383,284 B2 | 6/2008 | Heinrichs et al. |
| 7,463,263 B2 | 12/2008 | Gilboa |
| 7,840,935 B2 | 11/2010 | Fildebrandt et al. |
| 7,890,533 B2 | 2/2011 | Pollara |
| 7,917,549 B2 | 3/2011 | Arazi et al. |
| 8,078,643 B2 | 12/2011 | Mush et al. |
| 8,407,262 B2 | 3/2013 | Hsu et al. |
| 9,665,270 B2 | 5/2017 | Deb et al. |
| 2008/0098008 A1 | 4/2008 | Eid |
| 2009/0094538 A1 | 4/2009 | Ringler et al. |

(Continued)

FOREIGN PATENT DOCUMENTS

EP   0531319   11/1991

*Primary Examiner* — Eunhee Kim
(74) *Attorney, Agent, or Firm* — Fish & Richardson P.C.

(57) ABSTRACT

This disclosure generally relates to devices, systems, and computer-implemented methods for providing a graphical model editor that automatically arranges model entities and their relationships in a graphical manner. Specifically, methods are described herein for a graphical open data protocol model editor that automatically models entity relationships for a customized design of software applications. The methods comprise the operations of placing entities on a grid; drawing a horizontal pathway below the placed entities; dynamically adjusting the height of the rows; and drawing the associations of the entities placed on the grid, wherein spatial cross-over between the drawn associations may be reduced.

20 Claims, 4 Drawing Sheets

(56) References Cited

U.S. PATENT DOCUMENTS

| | | |
|---|---|---|
| 2011/0163968 A1 | 7/2011 | Hogan et al. |
| 2012/0137304 A1 | 5/2012 | Boullery et al. |
| 2012/0268467 A1 | 10/2012 | Madden et al. |
| 2012/0278696 A1 | 11/2012 | Carper et al. |
| 2013/0031126 A1 | 1/2013 | Setlur |
| 2013/0307854 A1 | 11/2013 | Nora et al. |

LAYOUT ALGORITHM FOR ENTITY RELATION MODEL DIAGRAM

CLAIM OF PRIORITY

This application claims priority under 35 USC § 120 to U.S. patent application Ser. No. 13/930,292, filed on Jun. 28, 2013 now U.S. Pat. No. 9,665,270 issued on May 30, 2017, the entire contents of which are hereby incorporated by reference.

TECHNICAL FIELD

The present disclosure relates to computer-implemented methods, devices and systems for providing a graphical model editor that automatically arranges model entities and their relationships in a graphical manner.

BACKGROUND

Data model relationship scenarios (e.g., business process diagrams) are used to visualize a message flow of a collaborative process which is outlined between multiple business partners and their interactions. These business partners can either refer to distinct components inside a single company or represent separate companies. A scenario object or entity can be considered a representation of an intelligible business/non-business entity, such as an account, an order, an employee, an invoice, and a financial report within or across companies. Interactions between each of the entities are made through the exchange of electronic messages. For each cross-component process step, i.e. the exchange of electronic messages between entities, process integration scenarios depict the sender and receiver as well as the sending and receiving interfaces.

Open Data Protocol (OData) is a data access protocol. The protocol was designed to provide standard create, read, update, and delete access to a data source via a website. OData may be used to access table-like structures similar to the way Structured Query Language (SQL) does, wherein an OData service may correspond to a database schema and an entity may correspond to database table. Customers (e.g., users of user devices) may run on-premise systems in hybrid landscapes together with on-demand systems, consuming data from both. Therefore there is a need for a set of tools that span across different platforms and provide an easy and efficient development experience around OData services.

SUMMARY

The present disclosure relates to computer-implemented methods, devices and systems for providing a graphical model editor that automatically arranges model entities and their relationships in a graphical manner.

One or more of the following aspects of this disclosure can be embodied as methods that include the corresponding operations. One or more of the following aspects of this disclosure can be implemented in a device comprising a processor, a computer-readable medium coupled to the processor having instructions stored thereon which, when executed by the processor, cause the processor to perform operations according to the one or more of the following aspects. One or more of the following aspects of this disclosure can be implemented on a computer-readable medium having instructions stored thereon that, when executed by a processor, cause the processor to perform operations according to the one or more of the following aspects.

In a general aspect 1, a computer-implemented method for graphically arranging model entities and their relationships, the method (e.g., a layout algorithm) comprising the following operations performed by one or more computing resources:
(i) receiving a grid comprising multiple rows r and multiple columns c defining multiple cells, wherein the number of columns is n (e.g., n=4);
(ii) receiving a plurality of entities, wherein each entity has an associated entity height, and wherein one or more of the entities in the plurality of entities are linked by one or more associations to one or more other entities in the plurality of entities;
(iii) calculating a number of entities associated with each of the plurality of entities;
(iv) placing entities from the plurality of entities with no or only self-associations in cells or the grid;
(v) drawing a horizontal pathway below each row of placed entities;
(vi) dynamically adjusting the height of the rows with placed entities;
(vii) placing a particular entity, from the plurality of entities, having the highest number of associations in grid cell (r, INT(n/2)) or (r, INT(h/2)), whichever is lower, where h is the number of associated entities to be placed in row r;
(viii) placing entities associated with the particular entity of the cell (r, INT(n/2)) or (r, INT(h/2)) in order of increasing or decreasing number of their own associations, wherein the placing is performed in the sequence (r, 1), (r, 3), (r, 4), (r, 5), . . . , (r, n), (r, INT(n/2)) or (r, INT(h/2)) for increasing number of their own associations, wherein the placing is performed in reverse sequence for decreasing number of their own associations, and wherein if a cell of the sequence is occupied then the occupied cell is skipped (e.g., bypassed, and the next cell in the sequence is used) for the placing;
(ix) repeat operation (viii) for each of the other entities from the plurality of entities until all associated entities are placed on the grid, wherein if one row is occupied move to the next row of the grid;
(x) dynamically adjusting the height of the rows with placed entities;
(xi) determining a remaining entity with next highest number of associations, wherein if this determined remaining entity is already placed on the grid, then repeat operation (viii) for entities not placed on the grid, else repeat operations (v) to (viii); and
(xii) drawing the associations of the entities placed on the grid, the associations drawn as lines connecting related entities.

Aspect 2 according to aspect 1, wherein the number of columns is predetermined based on a screen size of a user device, optionally wherein the user device is a computing device (e.g., a mobile communication device) remote from the one or more computing resources, and optionally, and wherein n is the number of columns not leading to a horizontal scroll for the given screen size of the user device.

Aspect 3 according to any one of aspects 1 to 2, wherein drawing the associations of the entities placed on the grid comprises: drawing self-associations first; drawing the associations along predetermined pathways on the grid; and maintaining a predetermined distance between the associations to avoid cross-over between the associations.

Aspect 4 according to aspect 3, wherein drawing the associations along predetermined pathways on the grid comprises: start drawing association for the entity in cell (1,1) and continue for placed entities on the grid from left to right and top to bottom of the grid, the drawing comprising: calculating a geometric distance between a pair of placed associated entities by calculating the geometric distance between their corresponding geometric centers; and drawing associations that leave and enter the entities of the pair of associated entities only at horizontal top or horizontal bottom edge of the associated entities, wherein the associations are drawn along one or more horizontal pathways of the grid, and wherein one or more bend points at vertical pathways are created to continue top or down on the grid based on position of the pair of placed associated entities.

Aspect 5 according to any one of aspects 1 to 4, the operations further comprising: detecting a spatial conflict between two or more associations; and resolving the spatial conflict by redrawing the two or more associations along predetermined pathways on the grid while maintaining a predetermined distance between the associations to avoid spatial cross-over between the associations.

Aspect 6 according to any one of aspects 1 to 5, wherein an entity (or model entity) is a representation of an intelligible business/non-business entity, such as an account, an order, an employee, an invoice, a machine, or a financial report, and/or wherein an association is a peer-to-peer linkage within an entity or between two or more entities, wherein upon drawing the associations, real peer-to-peer connections between real entities represented by the model entities are established according to the graphical entity model.

Aspect 7 according to any one of aspects 1 to 6, wherein the plurality of entities and the associations are part of an Open Data Protocol (OData) model.

Aspect 8 according to any one of aspects 1 to 7, wherein placing entities from the plurality of entities with no or only self-associations includes in cells of the grid includes: placing the entities with no or only self-associations in increasing order of entity heights in a first row and continue placing entities with no or only self-associations in a subsequent second row in opposite order of height; and continue alternating the order of entity heights for the placed entities with no or only self-associations.

DESCRIPTION OF DRAWINGS

Reference numbers and designations in the various drawings indicate exemplary aspects, implementations or embodiments of particular features of the present disclosure.

DETAILED DESCRIPTION

This disclosure generally relates to devices, systems, and methods for providing a graphical model editor that automatically arranges model entities and their relationships in a graphical manner. Specifically, methods are described herein for a graphical open data protocol model editor that automatically models entity relationships for a customized design of software applications.

The subject-matter described in this disclosure can be implemented in particular aspects or embodiments so as to realize one or more of the following example advantages, as well as others recognizable to one of skill in the art.

First, the development and generation of OData services is simplified by providing an intuitive handling of entity models thereby reducing a cognitive burden of a user. The barrier for developers to produce and consume OData may be lowered.

Second, entities are automatically modeled independent of the platform technology and whether on-premise or on-demand access to applications is chosen. The developers may be enabled to extend their tools for different platform environments, such as Android, Java, or PHP.

Third, no predetermined layout information is required for modeling of the entities. Integration of new entities or models is facilitated.

Fourth, a graphical user interface comprising entities and associations between the entities is provided that is especially adapted to allow a user to evaluate the displayed relationships more efficiently. In this context, a large number of entities (e.g., 1-20 or 50 entities) with a large number of associations (e.g., 1-10 associations, or 100 associations, or 1000 associations) may be graphically displayed with minimum spatial cross-over between these objects. For example, spatial conflicts between entities and/or associations may be detected and resolved to circumvent spatial overlap of the displayed objects.

Fifth, the graphical model editor may provide developers of technical products or processes (e.g., during development of machines or technical processes between machines) an assistant in simulating the technical products and their interrelationship with related/associated technical products and/or processes. Entities may be technical machines and associations may be data communication between the machines. This object-oriented programming may allow for an efficient employment of resources during technical developments and/or during operations of the machines or processes.

While generally described as computer-implemented software embodied on tangible media that processes and transforms the respective data, some or all of the aspects may be computer-implemented methods or further included in respective systems or other devices for performing this described functionality. The details of these and other aspects, implementations or embodiments of the present disclosure are set forth in the accompanying drawings and the description below. Other features, aims, and advantages of the disclosure will be apparent from the description and drawings.

Figure 1:
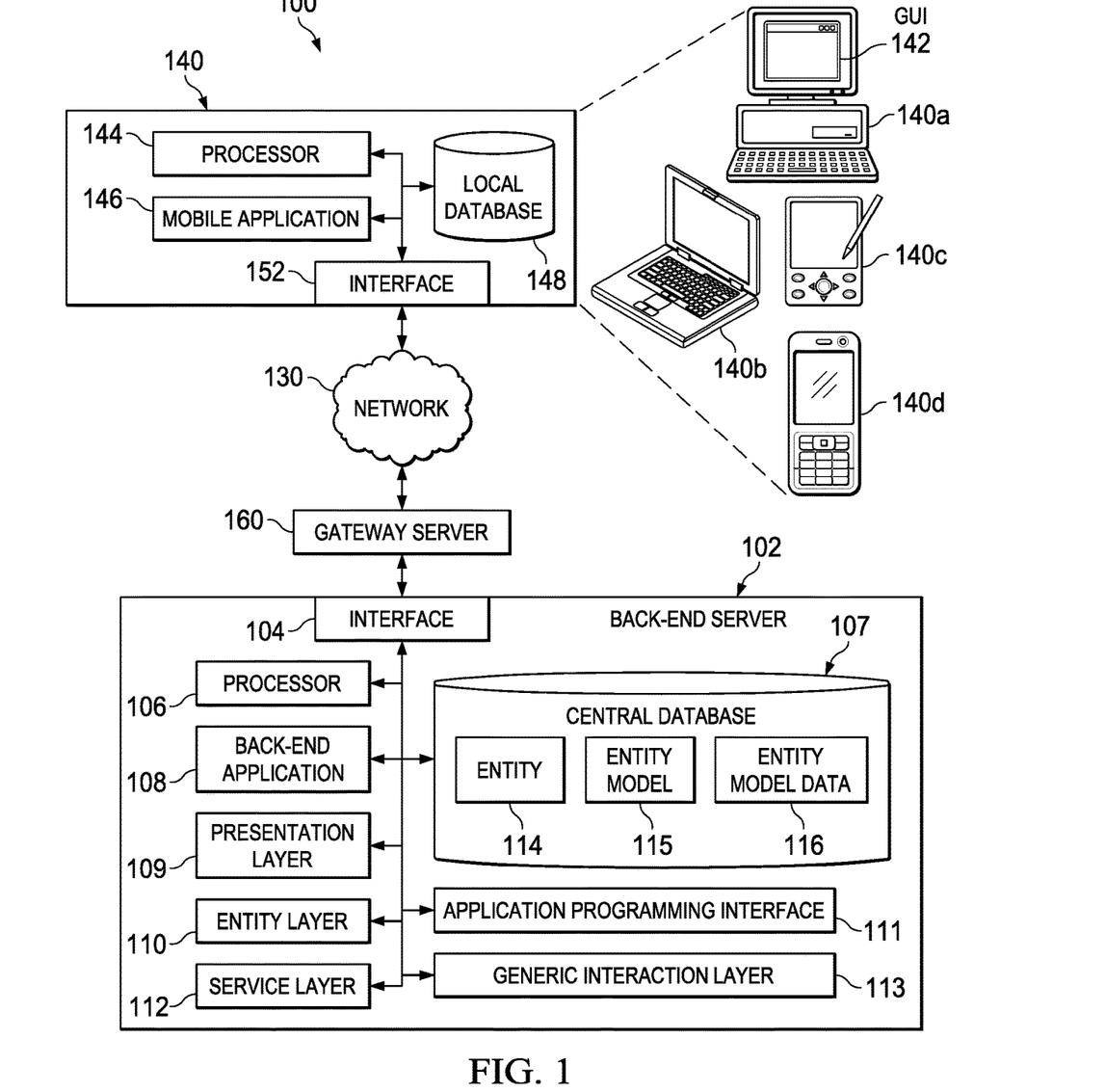
FIG. 1 illustrates an example distributed computing system for providing a graphical model editor that automatically arranges model entities and their relationships in a graphical manner.

FIG. 1 illustrates an example distributed computing system 100 operable to provide development of process integration scenarios on user devices according to one aspect of the disclosure. Specifically, the illustrated example distributed computing system 100 includes or is communicably coupled with a back-end server 102 (e.g., an enterprise services repository (ESR) server) and a user device 140 which may communicate across a network 130.

In general, the back-end server 102 is a server that stores one or more back-end applications 108 (e.g., an ESR application, an enterprise resource planning (ERP) application, etc.), where at least a portion of the back-end applications 108 are executed via requests and responses sent to users or clients within and communicably coupled to the illustrated example distributed computing system 100. In some implementations, the back-end server 102 may store a plurality of various back-end applications 108. In other implementations, the back-end server 102 may be a dedicated server meant to store and execute only a single back-end application 108. In some implementations, the back-end server 102 may comprise a web server, where the back-end applications 108 represent one or more web-based applications accessed and executed by the user device 140 via the network 130 or directly at the back-end server 102 to perform programmed tasks or operations of the back-end application 108.

At a high level, the back-end server 102 comprises an electronic computing device operable to receive, transmit, process, store, or manage data and information associated with the example distributed computing system 100. Specifically, the back-end server 102 illustrated in FIG. 1 is responsible for receiving application requests, for example scenario navigation requests, from one or more mobile applications 146 associated with the user device 140 of the example distributed computing system 100 and responding to the received requests by processing said requests in the associated back-end application 108, and sending the appropriate response from the back-end application 108 back to the requesting mobile application 146. In addition to requests from the user device 140, requests associated with the back-end applications 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single back-end server 102, environment 100 can be implemented using two or more servers 102, as well as computers other than servers, including a server pool. Indeed, back-end server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated back-end server 102 may be adapted to execute any operating system, including Linux, UNIX, Windows, Mac OS, Java, Android, iOS or any other suitable operating system. According to one implementation, back-end server 102 may also include or be communicably coupled with an e-mail server, a web server, a caching server, a streaming data server, and/or other suitable server.

The back-end server 102 also includes an interface 104, a processor 106, and a central database 107. The interface 104 is used by the back-end server 102 for communicating with other systems in a distributed environment—including within the environment 100—connected to the network 130; for example, the user device 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the back-end server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the back-end server 102. Specifically, the processor 106 executes the functionality required to receive and respond to requests from the user device 140 and/or allowing providing development of process integration scenarios on user device 140.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java, Visual Basic, assembler, Perl, any suitable version of 4GL, industry standard language, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The back-end server 102 also includes the central database 107, or multiple central databases 107. The central database 107 may include any type of memory or database module and may take the form of volatile and/or non-volatile memory including, without limitation, magnetic media, optical media, random access memory (RAM), read-only memory (ROM), removable media, or any other suitable local or remote memory component. The central database 107 may store various objects or data, including caches, classes, frameworks, applications, backup data, jobs, web pages, web page templates, entities in industry standard language, database tables, repositories storing business and/or dynamic information, and any other appropriate information including any parameters, variables, algorithms, instructions, rules, constraints, or references thereto associated with the purposes of the back-end server 102. Additionally, the central database 107 may include any other appropriate data, such as VPN applications, firmware logs and policies, firewall policies, a security or access log, print or other reporting files, as well as others. While central database 107 is illustrated as in integral component of the back-end server 102, in alternative aspect or implementation central database 107 can be external to the back-end server 102 and/or the example distributed computing system 100.

The back-end server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the back-end application 108 and/or one or more components of the back-end server or other components of the example distributed computing system 100, both hardware and software. For example, in one implementation, the back-end application 108 can utilize API 111 to communicate with the user device 140. Although the API 111 is shown as a stand-alone component within the back-end server 102, there may be multiple other APIs in the example distributed computing system 100 that are integrated into or accessible by individual components, both hardware and software. The back-end server 102 (e.g., an ESR server) may be based on a Java platform and/or the back-end application may be based on a Java runtime environment. In an aspect, the term "platform" or "technology" is understood to be at least one of operating system, hardware infrastructure and software development platform. In an implementation of the present disclosure described herein, the term "platform" or "technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "technology" comprises ByDesign platform, Success Factors Platform, ERP Suite technology or in-memory database such as High Performance Analytic Appliance (HANA) platform.

The service layer 112 provides software services to the example distributed computing system 100. The functionality of the back-end server may be accessible for all service consumers via this service layer. Software services, such as scenario navigation, provide reusable, defined business functionalities through a defined interface. The defined interface may be software written in extensible markup language (XML) or other suitable language. While illustrated as an integrated component of the back-end server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

The central database 107, i.e., a back-end data system, holds data for the back-end server 102. In some implementations, the central database 107 includes an entity 114, an entity model 115, and entity model data or metadata 116. Although illustrated as single instances, there may be more than one instance of the entity 114, entity model 115, and/or entity model data 116.

The term "entity" or "scenario object" 114 can be considered a representation of an intelligible business/non-business entity, such as an account, an order, an employee, an invoice, a financial report, etc. The scenario object or entity 114 may also be called a "business object" and may encompass both functions, for example in the form of methods, and data, such as one or more properties. For example, an account entity 114 may have properties such as Name, Priority, and Value, among others, as well as being associated with one or more operations and procedures. Entities 114 may reduce system complexity by reducing a system into smaller units. The graphical model editor described herein may be employed to modify an entity data model (EDM), which is used to describe OData services. Each entity may support create, read, update, and delete (CRUD) operations.

The implementation details of entities 114 are typically hidden from a non-development user and may be accessed through the defined functions and encapsulated data. Entities 114 also form a point of entry of the functions and data of a system and enable the system to easily share, communicate, display, or otherwise operate with other systems. An entity 114 may also be considered the target of a request for data in a particular process integration scenario, for example through a web page, and may contain a view to be displayed when the entity 114 is accessed. In some implementations, the entity 114 can control the location of a selected view, personalized views for a specific scenario user, and dynamic views. While illustrated as integrated with central database 107 of the back-end server 102 in the example distributed computing system 100, in alternative implementations the entity 114 can be stored external to the back-end server 102 and/or the user device 140.

ESR, as the environment for entities or entities, may provide CRUD operations for a plurality of the following objects: action, integrations process, monitoring process, step group, alert category, model, object definition, service interface, message type, fault message type, data type, data type enhancement, external definition, context object, business object, business object enhancement, agent, user interface text object, process component, operating mapping, message mapping function library, mapping template, imported archive, adapter metadata, communication channel template, change list, software component version, folder, namespace, usage profile, and connections, among others.

The entity model 115 is a model providing a structured way of representing relationships, associations, roles, etc. of and between entities 114 applicable to an organization. In general, the term "relationship" or "association" may be understood as a linkage within an entity 114 ("self-association" between functions of the entity 114) or between two or more entities 114. The association may be named "relationship" between two entities or between elements within one entity. Associations may define a peer-to-peer relationship between participating entity types and may support different multiplicities at both the ends. An example of an association may be the relationship between a customer entity and an order entity. The "association" may represent an electronic data connection used for data communication. There may be three types of "associations": single associations, bi-directional associations, and self-associations. A single association may be an unidirectional association, which allows navigation or data communication in only one direction. The bi-directional association may allow navigation or data communication in both directions of the association. The bi-directional association may be defaulted to a one-to-many association. The self-association may have its ends of the association point to the same entity. The entity model may thereby be represented through the use of an entity-relationship diagram (ERD) or other suitable diagram or descriptive method. An example entity model 115 for a ProductSeller business object, for example, may include root entities 114 such as Account and Order, each of which may contain their own methods, properties, and relationships to other dependent entities in the entity model 115. The root entities 114 may also have associations with other dependent entities 114. Examples of a dependent object for the Account root entity 114 may include AccountAddressUS. Example dependent entities for the Order rood entity 114 may include OrderPartner and OrderItemShipmentData. While illustrated as integrated with central database 107 of the back-end server 102 in the example distributed computing system 100, in alternative implementations the entity model 115 can be stored external to the back-end server 102.

The entity model data 116 is data and/or metadata associated with a specific instance of an entity 114. For example, for the example AccountAddressUS dependent object above, there may be properties Name, Title, Address1, Address2, City, State, and PostalCode. Entity data 116 would be the data associated with each property, for example, Name="XYZ, Inc.", Address1="12345 Any Street", Address2="Suite ABC", City="Some City", etc. In some implementations, the entity 114 or entity model data 116 may include, among other things: text, images, sounds, videos, and/or animations. While illustrated as integrated with central database 107 of the back-end server 102 in the example distributed computing system 100, in alternative implementations the entity model data 116 can be stored external to the back-end server 102 and/or the user device 140. The entity model data 116 may comprise a physical height of the entities and associations (or links) of the entities. In an aspect, the entities may be rectangular icons that have a width (horizontal on the screen) and a height Access to the back-end server 102 may be provided through the user device 140, for example, via a web browser or other suitable GUI 142 application interfacing with the user interface (UI) presentation layer 109 that further interfaces with the application programming interface 111 provided by an entity layer 110. The entity layer 110 provides a consistent interface for a GUI application to access entities 114 associated with the back-end application 108. Associated with the entity layer 110 is a generic interaction generic interaction layer 113 which provides a consistent interface for the entity layer 110 to access back-end application 108 entities 114 through APIs 111 and for the back-end application 108 to return data to the user device 140. At a high-level, generic interaction layer 113 may act as a bridge between the user device 140 and the back-end application 108. Because of this architecture, the user device 140 may not affected by changes to the underlying back-end application 108 as long as the entity layer 110, generic interaction layer 113 or APIs 111 interface(s) does not change. This architecture also may ensure that changes to a particular layer, API, etc. can also be isolated from affecting other layers, APIs, etc.

User devices 140 may access the back-end server 102 through the gateway server 160. The gateway server 160 provides one or more defined APIs and acts as an interface or gateway between a user device 140 and the back-end server 102. In some implementations, the gateway server 160 can communicate with user device 140 using Open Data (OData) protocol through hypertext transfer protocol (HTTP) or hypertext transfer protocol secure (HTTPS) requests. In some implementations, the gateway server 160 can use a remote function call (RFC) interface to communication with advanced business application programming (ABAP) language and/or non-ABAP programs. In some implementations, the gateway server 160 can be stand-alone. In some implementations, the gateway server 160 can be incorporated into any component of the example distributed computing system 100. In some implementations the gateway server 160 may be a hardware server, a software server, and/or a virtual server. In some implementations, the gateway server 160 can be part of a web server, a streaming server, an RSS server, or other suitable server.

The illustrated user device 140 further includes a processor 144, a local database 148, an interface 152 and a mobile application 146. In a general aspect, the user device 140*a-d* may be a tablet computer, a smartphone, a cell phone, a personal digital assistant (PDA), an e-book reader, a laptop or desktop computer or similar mobile computing devices. The mobile application 146 allows the user device 140 to request and view content on the user device 140. In some implementations, the mobile application 146 can be and/or include a web browser. In some implementations, the mobile application 146 can use parameters, metadata, and other information received at launch to access a particular set of data from the server 102. Once a particular mobile application 146 is launched, a user can interactively process a task, event, or other information which may be associated with the back-end server 102. Further, although illustrated as a single mobile application 146, the mobile application 146 may be implemented as multiple mobile applications in the user device 140.

Customers (e.g., users of devices 140*a-d*) may run on-premise systems in hybrid landscapes together with on-demand systems, consuming data from both. Therefore, a set of tools that span across different platforms are needed to provide an easy and efficient development experience around OData. To do so, the model editor is built as a building block for the development of user-centric applications.

Figure 2:
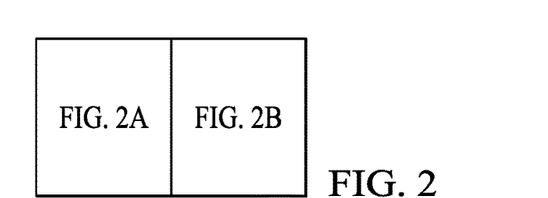
FIG. 2 is an example for the graphical OData model editor user interface.
Figure 2A:
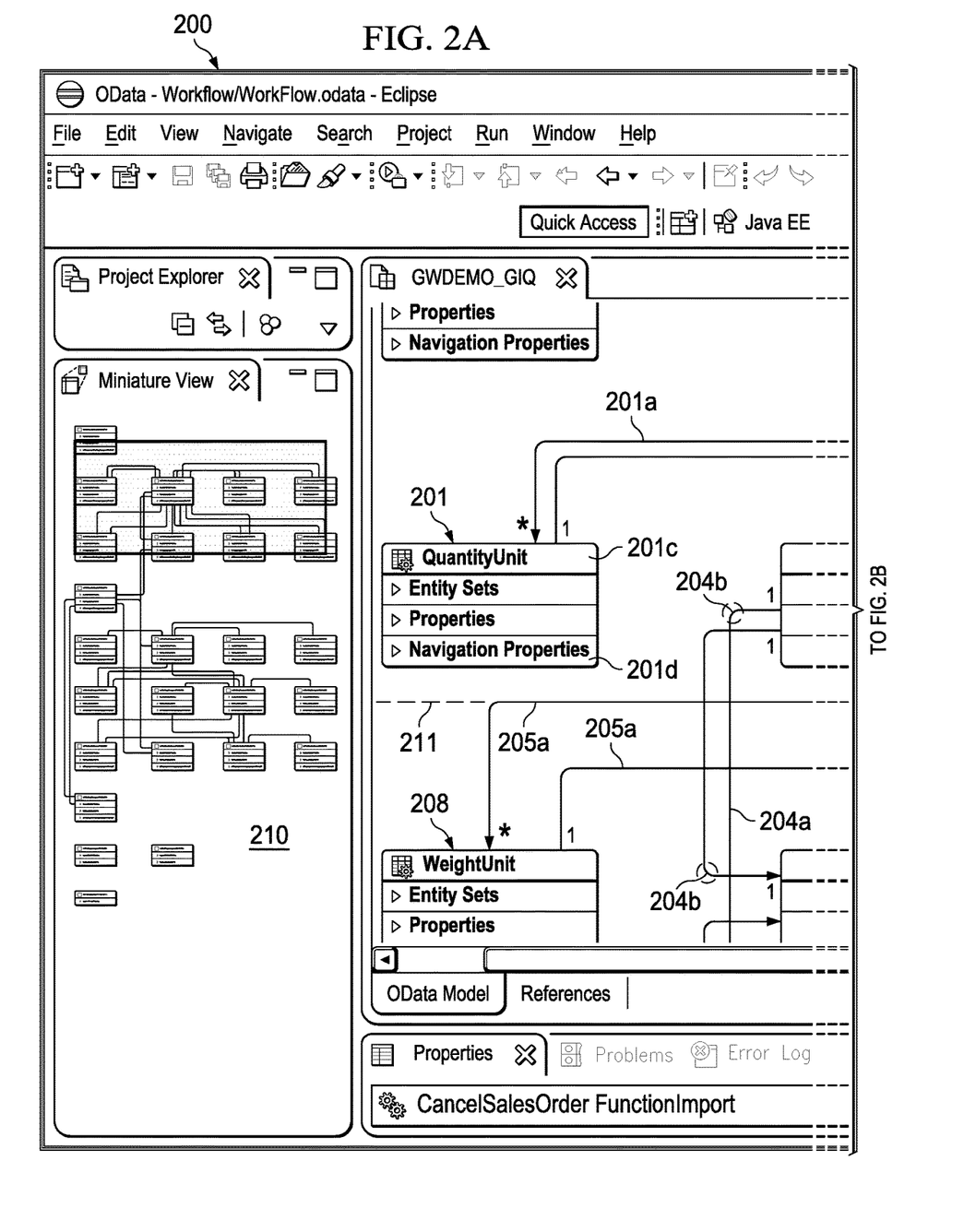
FIGS. 2A and 2B illustrate a detailed view of various aspects of the graphical OData model editor user interface.
Figure 2B:
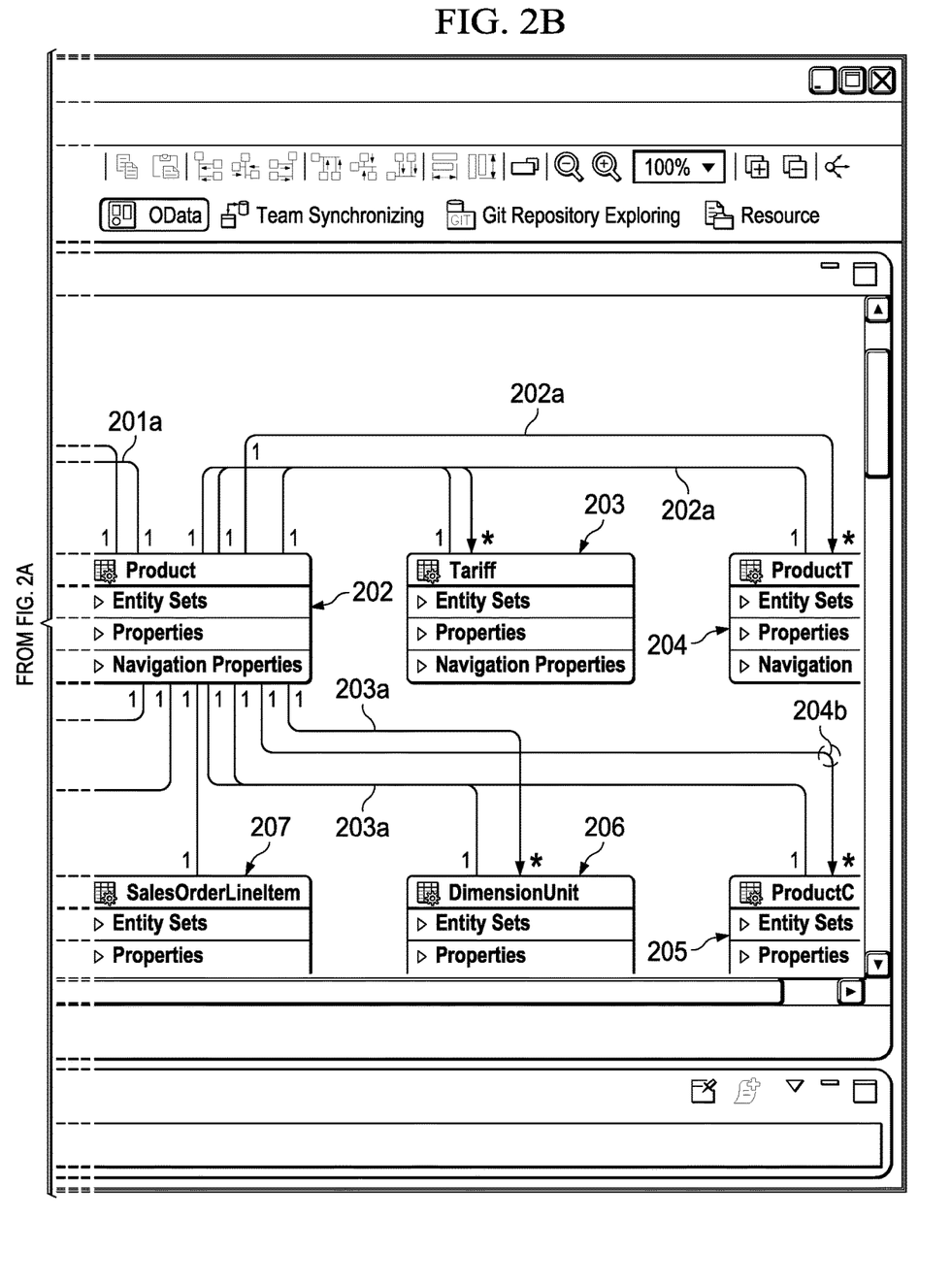

Turning now to FIG. 2, FIG. 2 represents an exemplary graphical model editor user interface 200 (described in more detail in FIGS. 2A and 2B) for automatically arranging model entities 201-208 and their relationships (e.g., links or associations) 202*a*-205*a* are illustrated in a graphical manner. FIGS. 2A and 2B show a graphical model editor 200 used to illustrate the entity relationship model and to declaratively define all elements of an OData model, currently along the OData V3 specification. For instance, there are several layout modes for newly imported models which come without layout information. A miniature view 210 may help navigating in larger models and speed-icons for entities and/or associations support fast editing. The modeler may offer comprehensive validations for the data model while being defined or enhanced. The user may import existing data models from a file or from an already running OData service. The user may also export data models (currently V2 and V3) for handover to a service implementation, for instance in Gateway Service Builder on ABAP. The model editor may be used to obtain user actions and data in order to generate programming code for OData models for providing people-centric applications on the user device 140.

The model editor may integrate gateway consumption tools for iOS, Android, HTML5, UI5, Java SE and PHP, which are available on SAP Service Marketplace and which allow easy generation of service proxies or even full-blown starter applications for common client technologies. In context of the graphical model editor, it may be beneficial to automatically layout the entity associations (relationships) in a diagram, such as diagram 200 of FIGS. 2A and 2B. Cross-over of entities and associations may lead to an unfavorable look of the diagram, as information contained in the diagram may not be accessible to the user. The entities may include one or more elements such as entity sets, properties, and navigation properties, among others, each of which may be associated (e.g., linked) with each other of with other entities and their corresponding elements. An exemplary problem statement may be to layout entities 201-208 and associations 201*a*-205*a* with no cross-over of entities on association 202*a*-204*a* in a graphical modeler, while trying to group the associated entities 201-208 together to show a clean picture. The suggested computer-implemented algorithm is meant to provide a graphical open data protocol model editor 200, which automatically models entity relationships, and which may comprise one or more of the following operations to do so:

1. Data preparation for modeling:
   a) Calculate the total number of entities 'N'
   b) Calculate the number of entities each entity is associated with. This may mean that all self-associations are considered '0'. Multiple associations between the same two entities are considered '1'. The number of associations may be considered 'h'.
2. Base rules:
a) A grid layout is used with rows r and columns c (with total number of columns n), that allows mostly vertical scrolling rather than horizontal scrolling along the grid:
   i. The number of columns n is especially adapted to a common screen size of user devices and may be adjusted depending on the screen size of the user device 140. As can be seen in FIGS. 2A and 2B, there may be n=4 columns in user interface 200.
   ii. The number of rows r can be a dynamic value.
b) Each cell may contain one entity.
c) Horizontal and vertical pathways in between two cells of the grid may be designated in order to draw associations 202a-205a. While the vertical pathway is fixed at the beginning, the horizontal pathway is dynamically calculated as and when each row is occupied.
3. Placement of entities:
a) Initially, entities with '0' (either no or only self-) linkage are placed in increasing order of height in a row from left to right. Then continue down at the end of all n columns in opposite order of height. Repeat until all such entities are placed.
b) Draw a horizontal pathway immediately below the entities placed in operation 3(a)
c) Draw a row ('r') for placing the entities with >0 association values. The entity with the highest 'h' linkage is used.
   i. If (h+1)/4>1, row height=height of this entity
   ii. Else, row height=height of largest associated entity
   In one example implementation, operation 3(c) may be replaced by a dynamic adjustment of the row height while keeping the remaining operations of the algorithm the same.
d) A horizontal pathway below this row is drawn.
e) The entity with highest number of associations may be placed in cell (r,2).
f) Next, the entities associated with the above-mentioned entity are placed in increasing order of their own association values. The number of related entities for the entity with the highest number of associations may be taken from operation 1(b). The sequence may be first left (r,1) and then to right (r, 3), (r, 4), (r, 5), . . . , (r, n) until the row r is occupied by entities.
   i. If the height of an associated entity is greater than the row-height, move one row down to place the subsequent entities. In one implementation, operation 3(f)(i) may be replaced by a dynamic adjustment of the row height.
   ii. If all four columns in row equal "r" are occupied, then move to next row down to place the subsequent entities. The sequence of placement of the entities in the columns may be column c=1, 3, 4, 2 (or c=1, 4, 3, 2). If a cell is occupied skip to next cell in this sequence.
   iii. If all four columns in rows greater than r are occupied, then the row height is limited as that of the largest entity, and a horizontal pathway is drawn below. Entities are placed in the next row with a sequence of column placement as 1, 3, 4, 2 (or c=1, 4, 3, 2). If a cell is occupied skip to next in sequence.
[In an alternative implementation, operations 3(f)(i)-(iii) may be replaced by the following operations 3(f')(iv)-(vi):
3(f'). Next, entities associated with the above mentioned entity are placed in decreasing order of their own association in following way:

iv. Assuming the total number of associated entities to be placed equals "h", then the number of rows needed=INT(h/n), where n=number of columns in the grid (i.e. nearest rounded integer for the quotient of this division), e.g. h/4. For example, if h=11, and n=4, then 3 rows are needed. In this case, add two more rows below the initially placed entity leaving a horizontal pathway in between.
   v. The highest associated entity is placed in the last row of column 2. Placement is continued in decreasing order of association through the columns, 2→4→3→1 (or c=2, 3, 4, 1). The height of the row is then dynamically adjusted.
   vi. Once a row is completely filled, move one row up and the same sequence as ii is repeated. The height of the current row is dynamically adjusted by pushing the rows underneath in case height is more. Repeat until all are placed.]
   In both of the implementations (either 3(f) or 3(f'), 3(f)(iii) is repeated until all associated entities are placed.
g) The next highest associated entity is then considered. There can be two cases:
   i. If the entity is not already placed in the grid, then the process moves to the next row and repeats operations 3(c) through 3(f) or 3(f').
   ii. If the entity is already placed in the grid, then the process repeats operations 3(f) or 3(f') for those associated entities which are not placed.
h) Operation 3(g) is then repeated until all entities are placed.
4. Drawing associations:
a) Self-associations are drawn first.
b) Associations are always drawn via the dedicated pathways, the drawing process comprising:
   i. Start drawing association for the entity in cell (1,1) from left to right and top to bottom.
   ii. Calculate the minimum distance between two entities by calculating the distance between their corresponding geometric centers.
   iii. Lines will come out of only horizontal top 401c (for related entities on same or rows above) or horizontal bottom 401d (when related entities are in rows below) edge of entity and not out of vertical edges.
   iv. If the center position of an edge is occupied, the line will start from some distance to the right or left based on the relative location of the associated entity, e.g. if the associated entity is to right, line is started from further right.
   v. Continue on the horizontal pathway to the left or right depending on whether the associated entity is to left or right relative to the entity. One or more (e.g., two) bend points are created at vertical pathways to continue top or down based on position of entity.
c) If multiple lines enter same edge of an entity, distance between them is to maintained to avoid convergence.

Figure 3:
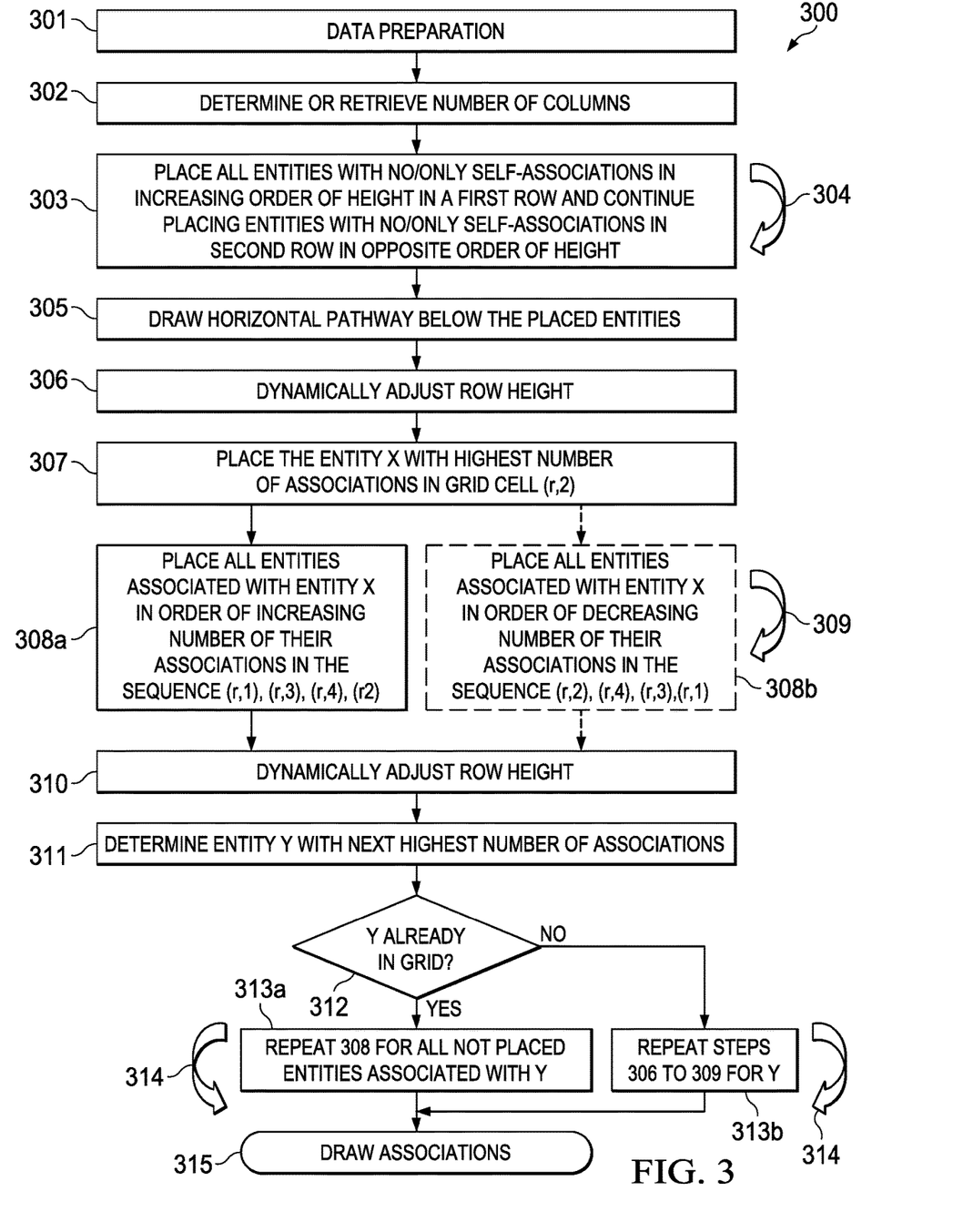
FIG. 3 is an exemplary layout algorithm for use by the graphical model editor.

Turning now to FIG. 3 an exemplary version of the above outlined layout algorithm is shown. Method 300 may provide a graphical model editor that automatically arranges model entities and their relationships in a graphical manner. At operation 301, the above mentioned data preparation operation 1 (from the above listing) is performed and may comprise at least one of (a) calculating the total number of entities 'n' from a received list of entities and (b) calculating the number of entities with which each entity is associated. This may mean that all self-associations are given a value of '0', multiple associations between same two entities are given a value of '1', and the highest number of associations may be a value 'h'. At operation 302, the total number of columns is determined or retrieved based on the screen size of the user device 140 where the entity model is to be displayed. In one example, the total number of columns is 4, i.e. '1' to '4'. Alternatively, at operation 302, the number of columns is predetermined or previously calculated, with the number being retrieved from a location in which the data is stored.

At operation 303, all entities with no associations or only self-associations are placed in increasing order of height in a first row. Operation 303 is continued to place entities with no associations or only self-associations in a second row in opposite order of height. In one example implementation, the distribution of entities across the rows may be performed so that a homogeneous distribution of entity height across the rows is achieved. At operation 304, operation 303 is repeated until all such entities are placed.

At operation 305, a horizontal pathway below the placed entities is drawn. At operation 306, the row heights are dynamically adjusted so that each row height equals or matches the height of the highest entity within the row.

At operation 307, the entity X having the highest number of associations is placed in cell (r,2) of the grid, wherein r is the next row that is empty and the column is 2.

Next, either operation 308*a* or operation 308*b* may be performed. At operation 308*a*, all entities associated with entity X are placed on the grid in order of increasing number of their associations in the sequence: (r, 1), (r, 3), (r, 4), (r, 2) (or (r, 1), (r, 4), (r, 3), (r, 2)). Alternatively, at operation 308*b*, all entities associated with entity X are placed in order of decreasing number of their associations in the sequence: (r, 2), (r, 4), (r, 3), (r, 1) (or (r, 2), (r, 3), (r, 4), (r, 1)). If one cell is occupied in the sequence, the occupied cell is skipped (e.g., bypassed) and the next cell in the sequence is used. At operation 309, the operation 308*a* or operation 308*b*, depending on which operation was chosen in the particular implementation, is repeated until all associated entities are placed on the grid, wherein if all cells in a row are occupied, then it is continued with the next row for placing the entities.

At operation 310, the row heights are dynamically adjusted so that each row height equals or matches the height of the highest entity within the row.

At operation 311, the entity Y with next highest number of associations is determined. At operation 312, it is determined if entity Y is already placed on the grid.

At operation 313*a*, which occurs where entity Y is already placed on the grid, operation 308 is repeated for all not placed entities associated with Y. At operation 313*b*, which occurs where entity Y is not already placed on the grid, operations 306 to 309 are repeated for entity Y.

At operation 314, the respective operations 313*a* or 313*b*, depending on which has been performed, are repeated until all entities are placed on the grid.

At operation 315, all associations are drawn within the grid. Drawing the associations may comprise at least one of the following: drawing self-associations first, drawing associations via the dedicated pathways, and, if multiple lines enter same edge of an entity, maintaining a predetermined distance between the multiple lines to avoid convergence, wherein the drawing of associations via the dedicated pathways may comprise at least one of the following:

a) starting drawing association for the entity in cell (1,1) from left to right and top to bottom;

b) calculating the minimum distance between two entities by calculating the distance between their corresponding geometric centers,    c) drawing association lines so that they come out of only horizontal top of the entity (for related entities on same or rows above) or horizontal bottom (when related entities are in rows below) edge of the entity and not its vertical edges,    d) if the center position of edge is occupied, then starting the association line from some distance to the right or left of the entity based on the relative location of the associated entity with regard to the entity (e.g. if the associated entity is to the right of the entity, then the association line is started from further right, i.e. off-center of the entity edge), and    e) continuing on the horizontal pathway to the left or right of the entity depending on whether the associated entity is to the left or right of the entity, and creating two bend points at vertical pathways to continue up or down based on position of the entity.

The result of method 300 may be the graphical model editor user interface illustrated in FIGS. 2A and 2B with entities 201-208 and associations 201*a*-205*a* respectively.

Turning back to FIGS. 2A and 2B, which show an exemplary GUI 200 of the graphical model editor using the layout algorithm as described in context of FIG. 3. Specifically, the drawn (uni-directional or bi-directional) associations 201*a*-205*a* and the entities 201-208 are shown. Apart from the 4 columns of entities, the miniature view 210 is shown, which indicates a currently viewed portion of the total entity model. As illustrated, associations 201*a*-205*a* come out of only horizontal top 201*c* (for related entities on same or rows above) or horizontal bottom 201*d* (when related entities are in rows below) edge of the entities 201-208 and not edges that are vertical to the bottom screen edge. Furthermore, if the center position of an entity edge is occupied, the associations 201*a*-205*a* start from some distance to the right or left of the entity edge based on the location of the respective associated entity 201-208, e.g. the associated entity 203 is to right of entity 202 so that the association 202*a* is started from further right of the top edge of entity 202. Drawing continues on the horizontal pathway 211 towards left or right depending on whether associated entities 201-208 are to left or right. In an aspect, one or more (e.g., two) bend points 204*b* at each of the vertical pathways are created to continue along vertical pathways (top or down) based on position of the associated entities 201-208.

As a result, a GUI 200 comprising entities 201-208 and associations 201*a*-205*a* between the entities 201-208 is provided that is especially adapted to allow a user to evaluate the displayed relationships more efficiently. Minimum spatial cross-over between the displayed objects (entities and associations) may be provided. For example, spatial conflicts between entities and/or associations may be detected and resolved to circumvent spatial overlap of the displayed objects.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example distributed computing system 100 may use processes with additional operations, fewer operations, and/or different operations, so long as the methods remain appropriate. Process operations may also be executed and described software/services may also execute on various components of example distributed computing system 100 so long as the methods remain appropriate. Moreover, although features may be described above as acting in certain combinations and even initially claimed as such, one or more features from a claimed combination can in some cases be excised from the combination, and the claimed combination may be directed to a sub-combination or variation of a sub-combination.

In other words, although this disclosure has been described in terms of certain aspects or embodiments and generally associated methods, alterations and permutations of these aspects, embodiments and methods will be apparent to those skilled in the art.

What is claimed is:

1. A computer-implemented method for graphically arranging model entities, the method performed by at least one processor, the method comprising:
   receiving a grid that includes cells defined by rows and columns;
   receiving entities to be presented in the grid, each of the entities having an associated entity height, one or more of the entities being linked to one or more other entities by one or more associations;
   calculating a number of other entities associated with each of the entities; and
   placing one or more of the entities in one or more cells of the grid and, responsive to the placing, dynamically adjusting a height of each row according to the respective entity heights of the placed entities in the respective row, wherein placing the one or more entities includes:
   placing, in a middle cell of the respective row, a respective entity having a highest number of associations;
   placing, in the respective row, other entities that are associated with the respective entity, the placing of the other entities performed in an order according to a number of the associations of each of the other entities with the respective entity;
   drawing, on the grid, a line indicating an association between each pair of associated entities placed in the grid; and
   presenting the grid on a display of a user computing device.

2. The method of claim 1, further comprising:
   determining, for each respective entity of the entities, a number of self-associations for the respective entity, wherein a self-association is an association between different functions of the respective entity; and
   drawing, on the grid an additional line indicating a self-association for the respective entity.

3. The method of claim 2, wherein the placing of the entities in the grid is further based on the number of self-associations for each respective entity.

4. The method of claim 1, further comprising:
   drawing a horizontal pathway below each row of placed entities in the grid, the horizontal pathway dynamically calculated as each row is occupied in the grid;
   wherein drawing the line between each pair of associated entities includes drawing at least one line that follows the horizontal pathway.

5. The method of claim 1, wherein the other entities are placed in the respective row in the order such that the number of associations of the other entities decrease with increasing distance from the middle cell.

6. The method of claim 1, wherein:
   at least one of the entities has no associations to other entities; and
   the at least one of the entities with no associations to other entities is placed in the respective row in a farthest cell from the middle cell.

7. The method of claim 1, wherein a number of the columns is determined such that the grid fits, without scrolling, on the where the grid is presented.

8. The method of claim 1, wherein:
   an entity describes an account, an order, an employee, an invoice, a machine, or a report; and
   an association between entities is a peer-to-peer linkage between entities.

9. The method of claim 1, wherein the other entities are placed in the respective row in the order further according to the entity height of each of the other entities.

10. A system for graphically arranging model entities, the system comprising:
    at least one processor; and
    a memory storing instructions which, when executed by the at least one processor, cause the at least one processor to perform operations comprising:
    receiving a grid that includes cells defined by rows and columns;
    receiving entities to be presented in the grid, each of the entities having an associated entity height, one or more of the entities being linked to one or more other entities by one or more associations;
    calculating a number of other entities associated with each of the entities; and
    placing one or more of the entities in one or more cells of the grid and, responsive to the placing, dynamically adjusting a height of each row according to the respective entity heights of the placed entities in the respective row, wherein placing the one or more entities includes:
    placing, in a middle cell of the respective row, a respective entity having a highest number of associations;
    placing, in the respective row, other entities that are associated with the respective entity, the placing of the other entities performed in an order according to a number of the associations of each of the other entities with the respective entity; and
    drawing, on the grid, a line indicating an association between each pair of associated entities placed in the grid.

11. The system of claim 10, further comprising:
    determining, for each respective entity of the entities, a number of self-associations for the respective entity, wherein a self-association is an association between different functions of the respective entity; and
    drawing, on the grid an additional line indicating a self-association for the respective entity.

12. The system of claim 11, wherein the placing of the entities in the grid is further based on the number of self-associations for each respective entity.

13. The system of claim 10, further comprising:
    drawing a horizontal pathway below each row of placed entities in the grid, the horizontal pathway dynamically calculated as each row is occupied in the grid;
    wherein drawing the line between each pair of associated entities includes drawing at least one line that follows the horizontal pathway.

14. The system of claim 10, wherein the other entities are placed in the respective row in the order such that the number of associations of the other entities decrease with increasing distance from the middle cell.

15. The system of claim 10, wherein:
at least one of the entities has no associations to other entities; and
the at least one of the entities with no associations to other entities is placed in the respective row in a farthest cell from the middle cell.

16. The system of claim 10, wherein a number of the columns is determined such that the grid fits, without scrolling, on a display of a user device where the grid is to be presented.

17. The system of claim 10, wherein:
an entity describes an account, an order, an employee, an invoice, a machine, or a report; and
an association between entities is a peer-to-peer linkage between entities.

18. The system of claim 10, wherein the other entities are placed in the respective row in the order further according to the entity height of each of the other entities.

19. One or more non-transitory computer-readable storage media storing instructions which, when executed by at least one processor, cause the at least one processor to perform operations comprising:
receiving a grid that includes cells defined by rows and columns;
receiving entities to be presented in the grid, each of the entities having an associated entity height, one or more of the entities being linked to one or more other entities by one or more associations;
calculating a number of other entities associated with each of the entities; and
placing one or more of the entities in one or more cells of the grid and, responsive to the placing, dynamically adjusting a height of each row according to the respective entity heights of the placed entities in the respective row, wherein placing the one or more entities includes:
placing, in a middle cell of the respective row, a respective entity having a highest number of associations;
placing, in the respective row, other entities that are associated with the respective entity, the placing of the other entities performed in an order according to a number of the associations of each of the other entities with the respective entity; and
drawing, on the grid, a line indicating an association between each pair of associated entities placed in the grid.

20. The one or more non-transitory computer-readable storage media of claim 19, wherein the other entities are placed in the respective row in the order such that the number of associations of the other entities decrease with increasing distance from the middle cell.

* * * * *